(12) United States Patent
Büttner et al.

(10) Patent No.: US 9,154,017 B2
(45) Date of Patent: Oct. 6, 2015

(54) ELECTRICAL MACHINE WITH TWO AXIAL FANS

(75) Inventors: Klaus Büttner, Hollstadt (DE); Norbert Wöhner, Heustreu (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 483 days.

(21) Appl. No.: 13/541,218

(22) Filed: Jul. 3, 2012

(65) Prior Publication Data

US 2013/0175892 A1  Jul. 11, 2013

(30) Foreign Application Priority Data

Jul. 5, 2011  (DE) .................. 10 2011 078 671

(51) Int. Cl.
*H02K 9/06* (2006.01)
*B64D 35/06* (2006.01)
*H02K 7/112* (2006.01)

(52) U.S. Cl.
CPC ........ *H02K 9/06* (2013.01); *B64D 35/06* (2013.01); *H02K 7/112* (2013.01)

(58) Field of Classification Search
CPC ........... H02K 9/06; H02K 7/112; B64D 35/06
USPC ............ 310/58, 59, 63, 100; 290/1 B; 415/61
IPC ...................................................... H02K 9/06
See application file for complete search history.

(56) References Cited

U.S. PATENT DOCUMENTS

| | | | |
|---|---|---|---|
| 6,388,346 B1 * | 5/2002 | Lopatinsky et al. | 310/63 |
| 6,761,144 B2 * | 7/2004 | Schwam | 123/242 |
| 6,856,042 B1 * | 2/2005 | Kubota | 290/55 |
| 8,449,252 B2 | 5/2013 | Van Otten Tolman | 416/1 |
| 8,742,612 B1 * | 6/2014 | Robbins et al. | 290/55 |
| 2012/0074712 A1 * | 3/2012 | Bursal | 290/55 |
| 2013/0175892 A1 * | 7/2013 | Buttner et al. | 310/63 |

FOREIGN PATENT DOCUMENTS

| | | |
|---|---|---|
| DE | 431682 A | 6/1924 |
| DE | 7032537 U | 1/1971 |
| DE | 1613420 B2 | 9/1976 |
| DE | 102005051373 A1 | 5/2007 |

* cited by examiner

*Primary Examiner* — John K Kim
(74) *Attorney, Agent, or Firm* — Henry M. Feiereisen LLC

(57) ABSTRACT

An electrical machine includes a stator, a rotor magnetically interacting with the stator, a shaft supported on the stator for rotation in a first direction of rotation and in a second direction of rotation which is opposite to the first direction of rotation, wherein the rotor is arranged on the shaft, a first axial fan mounted on the shaft on a side of the rotor for co-rotation with the shaft in the first direction of rotation and having freewheeling capability on the shaft in the second direction of rotation, and a second axial fan mounted on the shaft on the same side of the rotor as the first axial shaft for co-rotation with the shaft in the second direction of rotation and having freewheeling capability on the shaft in the first direction of rotation.

5 Claims, 6 Drawing Sheets

ELECTRICAL MACHINE WITH TWO AXIAL FANS

CROSS-REFERENCES TO RELATED APPLICATIONS

This application claims the priority of German Patent Application, Serial No. 10 2011 078 671.6, filed Jul. 5, 2011, pursuant to 35 U.S.C. 119(a)-(d), the disclosure of which is incorporated herein by reference.

BACKGROUND OF THE INVENTION

The present invention relates to an electrical machine with two axial fans.

The following discussion of related art is provided to assist the reader in understanding the advantages of the invention, and is not to be construed as an admission that this related art is prior art to this invention.

Electrical machines (especially electric motors and generators) frequently possess a cooling system with a fan and a fan cowl for optimizing the dissipation of heat. The fan sucks in the cooling air, which is then blown onto the electrical machine via cooling ribs of the housing. For a good cooling effect a sufficient volume of air or volume of cooling medium must be conveyed.

The cooling of electrical machines is possible with different fans. For example radial fans and axial fans can be used for cooling, which are mounted directly on the motor shaft. Radial fans have fan blades which extend radially outwards and which are likewise designed to convey the cooling medium radially outwards. The conveyance of the cooling medium by radial fans is independent of the direction of rotation of the electrical machine.

With axial fans the fan blades are attached with a specific inclination to the fan boss. The axial fan conveys the cooling medium in the axial direction. The direction of conveyance however depends upon the direction of rotation of the shaft and on the direction of inclination of the fan blades. Generally the axial fan conveys more cooling medium than the radial fan. To utilize the advantages of axial fans (high-volume airflow and low noise) the fans have previously always had to be tailored to the direction of rotation of the electrical machine.

In addition it is possible to cool an electrical machine with the aid of an external fan. External fans are generally embodied as axial fans. They have their own drive with a fixed direction of rotation. Therefore the cooling is undertaken independently of the direction of rotation of the shaft of the electrical machine. However external fans always require their own drive.

It would therefore be desirable and advantageous to provide an improved electrical machine in which independent of the direction of rotation, a highly effective cooling of the electrical machine is achieved while the required installation space is reduced as much as possible.

SUMMARY OF THE INVENTION

According to one aspect of the present invention, an electrical machine includes a stator, a rotor magnetically interacting with the stator, a shaft supported on the stator for rotation in a first direction of rotation and in a second direction of rotation which is opposite to the first direction of rotation, with the rotor being arranged on the shaft, a first axial fan mounted on the shaft on a side of the rotor for co-rotation with the shaft in the first direction of rotation and having freewheeling capability on the shaft in the second direction of rotation, and a second axial fan mounted on the shaft on the side of the rotor for co-rotation with the shaft in the second direction of rotation and having freewheeling capability on the shaft in the first direction of rotation.

In an advantageous manner the electrical machine thus possesses two axial fans disposed behind one another on the shaft on one side (ventilation side; B-side) of the machine. Thus a flow of cooling medium is only necessary from the ventilation side independently of the direction of rotation. The freewheel of the axial fans guarantees in this case that for each of the directions of rotation only specifically one of the axial fans will be directly driven. The other axial fan freewheels and can rotate along with the shaft or in the opposite direction. The principle of the axial fans guarantees high cooling performance.

According to another advantageous feature of the present invention, the first axial fan can have a boss and a fan wheel connected to the boss, wherein the fan wheel can have a first inclination on a circumference of the boss, wherein the second axial fan can have another boss and another fan wheel connected to the another boss, wherein the another fan wheel can have a second inclination on a circumference of the another boss, and wherein in an installed state of the first and second axial fans the first and second inclinations are oriented opposite to one another.

In accordance with an embodiment the two axial fans are each supported with a roller bearing with return stop on the shaft. This enables it to be guaranteed in a simple manner that the fans are each only driven in a prespecified direction while there is freewheeling in the other direction of rotation.

In accordance with another embodiment the two axial fans are each supported with a roller bearing on the shaft and a coupling device connects the first axial fan in the first direction of rotation and the second axial fan in the second direction of rotation via a form fit or friction fit to the shaft. Since the coupling device is separated from the roller bearings a high-quality support can be guaranteed.

Specifically the coupling device can have a flywheel which is attached between the two axial fans on a thread of the shaft for rotational movement, and which on the sides facing the axial fans has a friction surface in each case, with the two axial fans each having a corresponding friction surface in order, depending on the direction of rotation of the shaft, to establish a friction connection to the flywheel. In particular when the shaft is accelerating the flywheel is then pushed onto the respective desired axial fan so that a rotational movement is imparted to the latter by friction.

The coupling device can also have a latching mechanism with which the flywheel latches releasably resting axially either on the first axial fan or to the second axial fan with a friction connection. Like a bayonet connection the flywheel then for example connects to the respective axial fan through the start-up torque and takes said fan with it.

Advantageously the two axial fans are arranged on one ventilation side, with a bearing bracket on which the shaft is supported being disposed between the stator and the axial fans, and with a flow of cooling medium from each of the axial fans being able to be conveyed in an axial direction through the bearing bracket directly to the stator and/or rotor. This has the advantage that, regardless of the direction of rotation of the electrical machine, the flow of cooling medium conveyed by the axial fans can strike the components to be cooled without being diverted.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
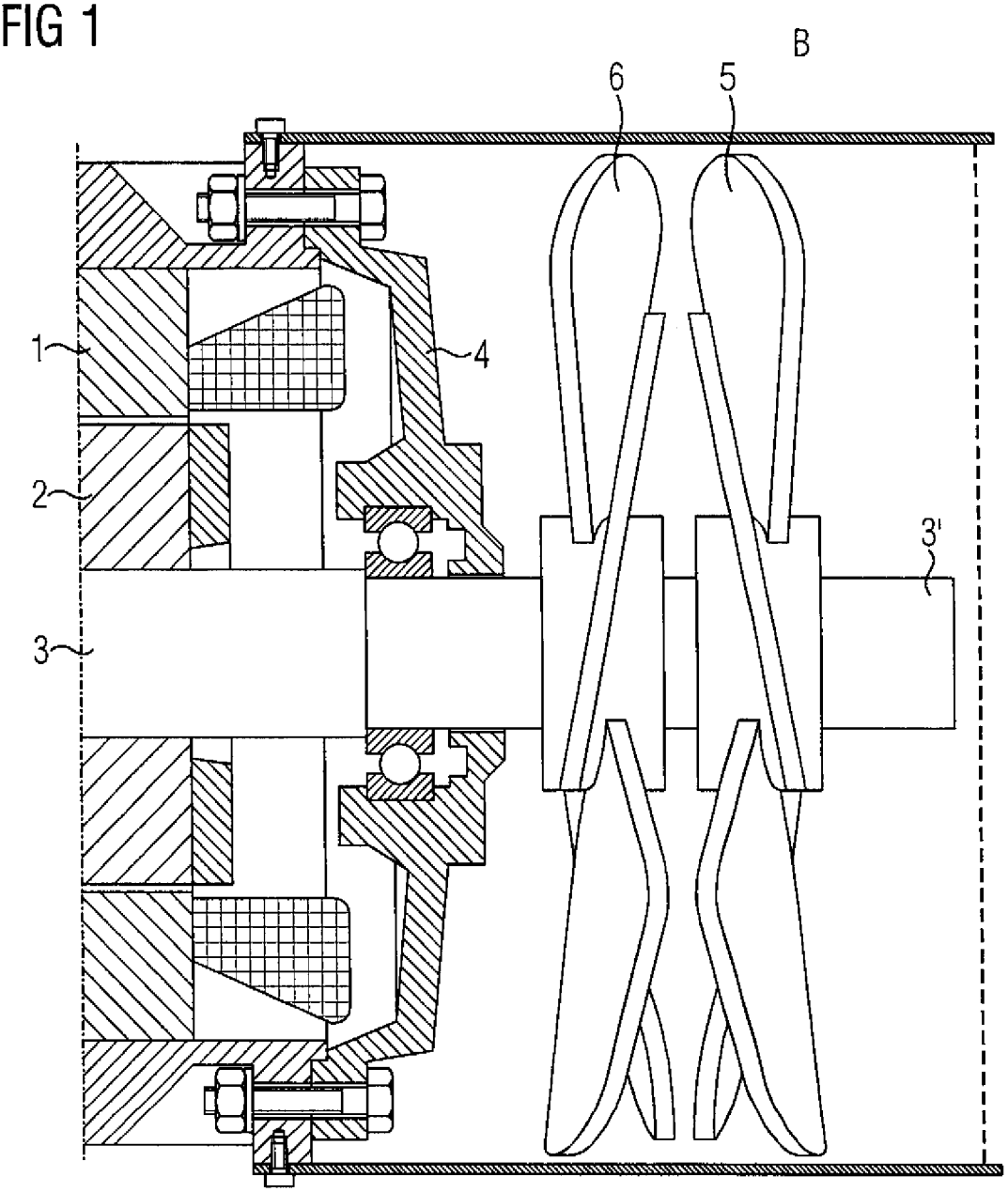
FIG. 1 shows a view of the ventilation side of the inventive motor.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown the ventilation-side end of a longitudinal section through an electrical machine (e.g. motor or generator). The electrical machine possesses a stator 1 and a rotor 2. The rotor 2 is attached to a shaft 3, which for its part is supported rotatably in a bearing bracket 4, which is part of a housing of the electrical machine. A stub shaft 3' of the shaft 3 projects on the ventilation side B from the bearing bracket 4. In accordance with the invention two axial fans 5, 6 are supported on the stub shaft 3'.

The two axial fans 5 and 6 are each designed for opposing directions of rotation. In the present example of FIG. 1 the one axial fan 5 is designed to run to the left and the axial fan 6 is designed to run to the right. Only in this respective predetermined run direction does the respective axial fan convey air or cooling medium through to the housing of the electrical machine.

Thus two axial fans 5, 6 acting in opposite directions are provided, with one of the two, depending on the direction of rotation, being driven by the electric motor or generator and the second fan being able to freewheel in this direction. The two fans are connected via a corresponding bearing rotatably to the shaft 3 or the stub shaft 3'.

Figure 2:
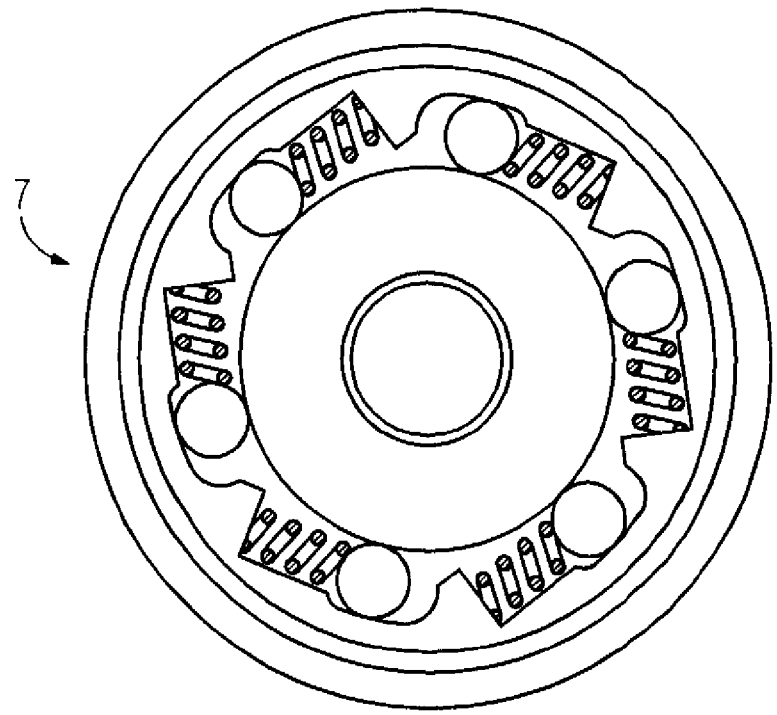
FIG. 2 shows a ball bearing with a freewheel.
Figure 3:
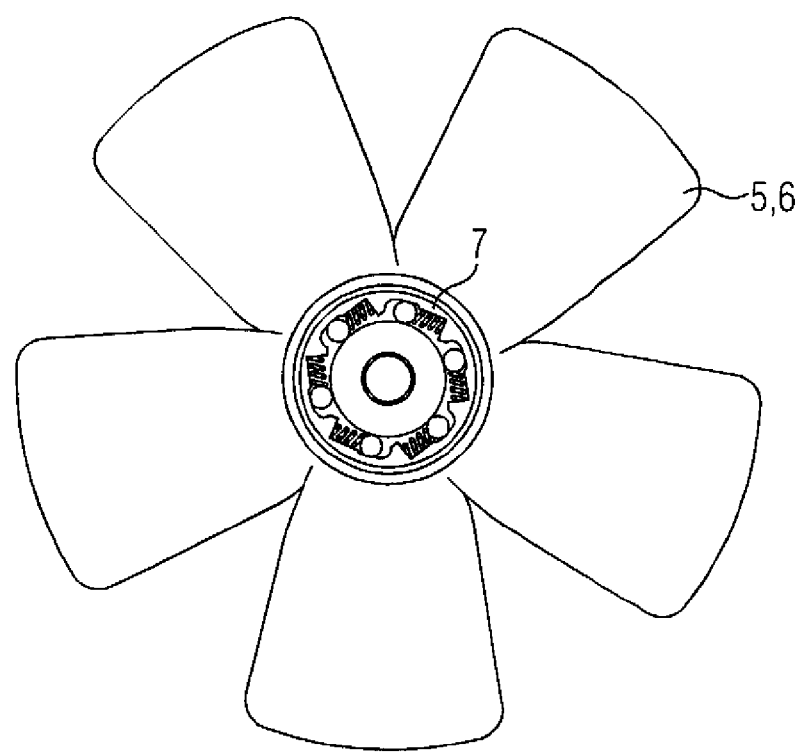
FIG. 3 shows an axial fan with a ball bearing including return stop.

In a first exemplary embodiment the axial fans 5, 6 are supported in accordance with FIG. 2 with the aid of a ball bearing 7 with built-in return stop. Such ball bearings with return stop are sufficiently well known. FIG. 3 shows an axial fan 5, 6, the boss of which features a ball race 7 with return stop. The ball races 7 are to be oriented accordingly for the two axial fans 5, 6, so that a return stop is produced in one direction for the one fan and a return stop is produced in the other direction for the other fan.

Figure 4:
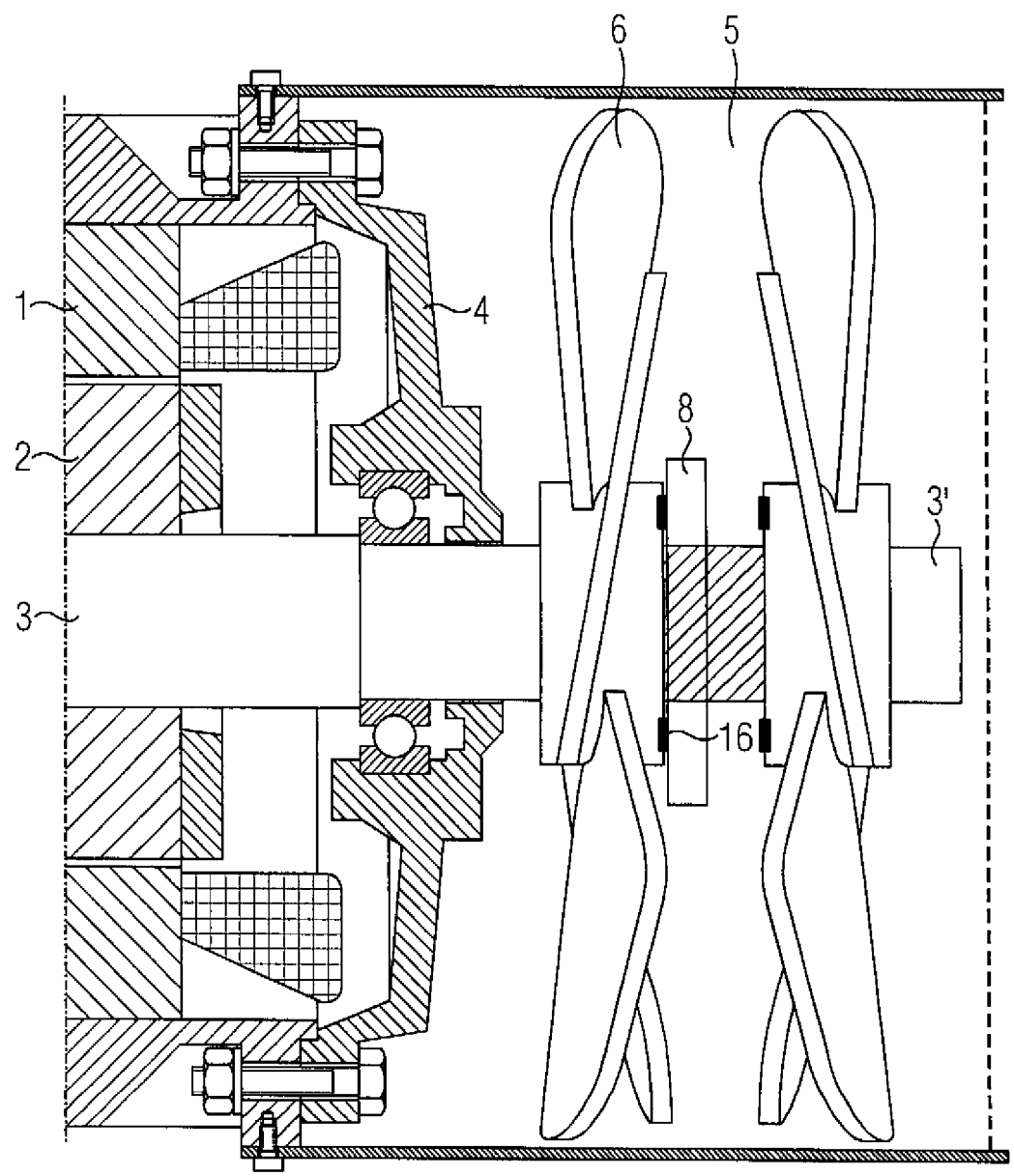
FIG. 4 shows a view of the ventilation side of an inventive electric motor of a second embodiment.

In accordance with an alternate embodiment the rotation direction-dependent, mutual coupling of the fans 5, 6 is undertaken via a flywheel 8 which is part of coupling mechanism 18 and sits on the shaft 3 (cf. FIG. 4). The flywheel 8 is in shape of a ring and has an internal thread. It is arranged between the two fans 5 and 6. A section 9 of the stub shaft 3 between the two axial fans 5, 6 (cf. FIG. 5) has an external thread 10 corresponding to the internal thread of the flywheel 8. Through rotational movement the flywheel 8 can move to and fro on the section 10 between the two axial fans 5 and 6, as the basic diagrams of FIGS. 5 and 6 show.

Figure 5:
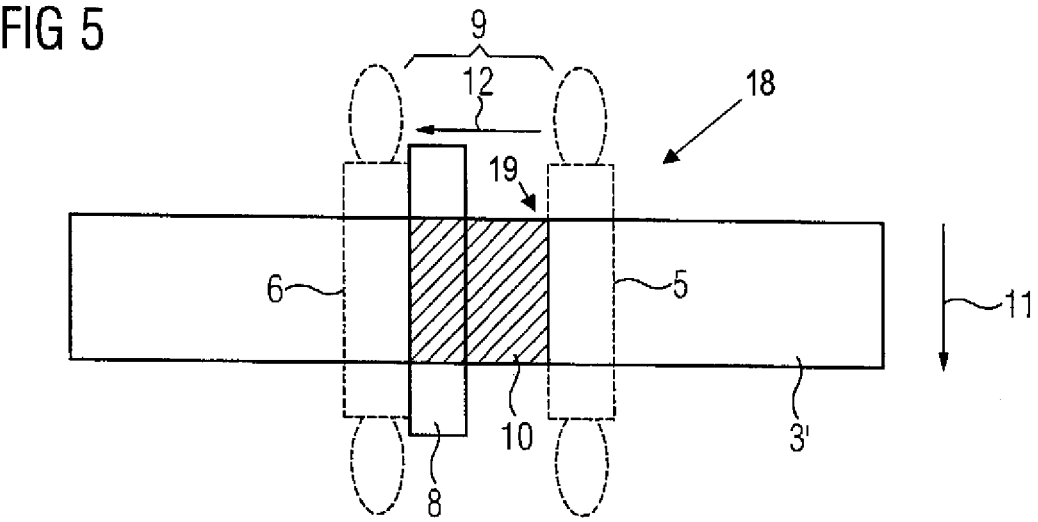
FIG. 5 shows a basic sketch of the coupling device indicated in FIG. 4 in a first position.

In the example of FIG. 5 the shaft 3 or 3' rotates in accordance with arrow 11. Because of the thread 10 the flywheel 8 pushes at least during the accelerations corresponding to arrow 12 to the left onto the axial fan 6. The two axial fans 5, 6 are supported with the aid of simple roller bearings on the stub shaft 3'. As soon as there is now a frictional connection between the flywheel 8 and the axial fan 6, the flywheel 8 takes the axial fan 6 with it, so that said fan also starts to rotate in accordance with the rotational movement 11.

Figure 6:
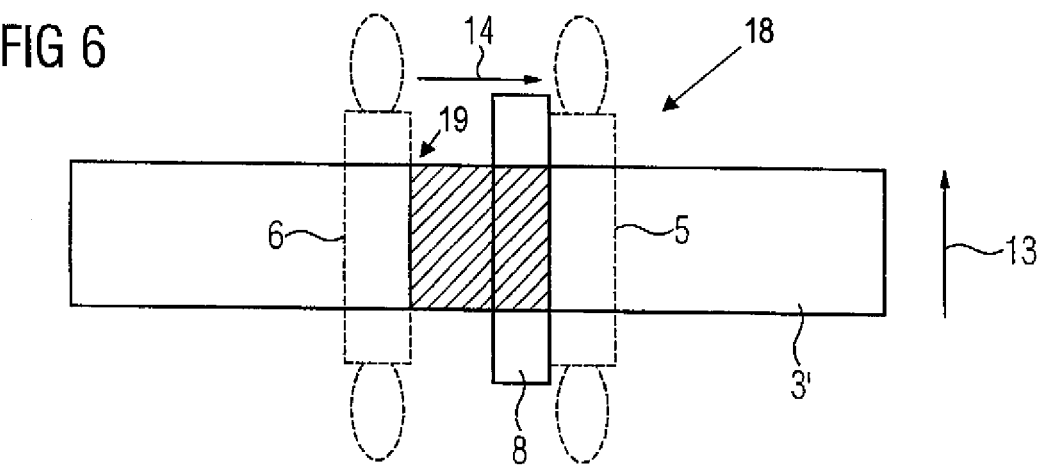
FIG. 6 shows the coupling device from FIG. 5 in a second position.

If the electrical machine or the shaft 3 is driven in the opposite direction in accordance with arrow 13 of FIG. 6, the flywheel 8 is pushed by the thread 10 to the right onto the axial fan 5, as illustrated by arrow 14. While axial fan 5 remained free during the rotation in accordance with FIG. 5, in the example of FIG. 6, with the reverse rotation it will now be held and carried along by frictional force by the flywheel 8. The axial fan 5 now conveys air or cooling medium to the electrical machine. In this state the other axial fan 6 is able to be freely rotated on the stub shaft 3'.

So that a friction fit is also produced between the flywheel 8 and the corresponding axial fan 5, 6 when the shaft is rotating at a constant speed, there can be provision for a latching mechanism 19 for the flywheel 8 to be latched in the respective end position in which frictional connection is guaranteed. This can be implemented for example by the thread being very flat in the respective end position (especially also infinitely flat). This would thus result in a principle similar to that of a bayonet connection. When there is a change in the direction of rotation, the flywheel then rotates as a result of its own inertia from the latched position and is then guided across to the opposite axial fan.

Figure 7:
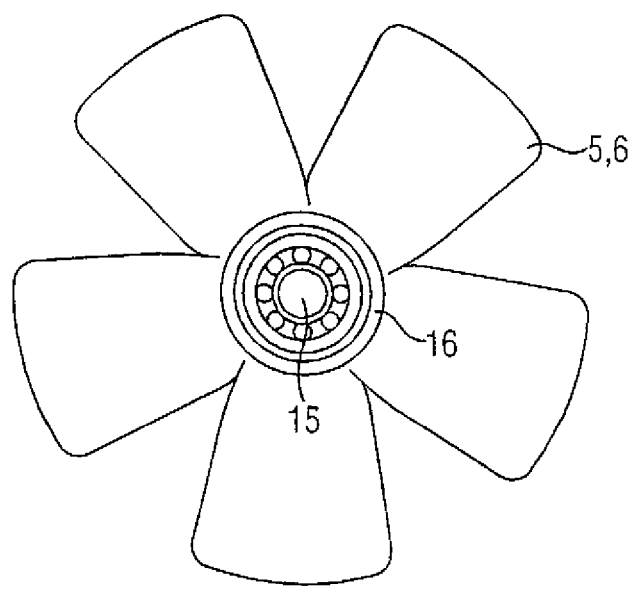
FIG. 7 shows an axial fan with rotatable flywheel seen from above.

FIG. 7 shows an axial fan 5, 6, as can be employed in the present exemplary embodiment. Located in the boss of the axial fan 5, 6 is a simple roller or ball bearing 15. This makes the axial fans 5, 6 basically freely rotatably supported on the shaft 3. In addition a friction ring 16 is attached to the boss of the axial fans 5, 6. If the flywheel is pushed against the friction ring 16, a corresponding frictional connection is produced and torque can be transmitted via this frictional connection. In the example of FIG. 4 the flywheel 8 is against the friction ring 16 of the fan 6 for example, so that the latter is driven by the shaft 3. The other axial fan 5 is freewheeling accordingly.

Figure 8:
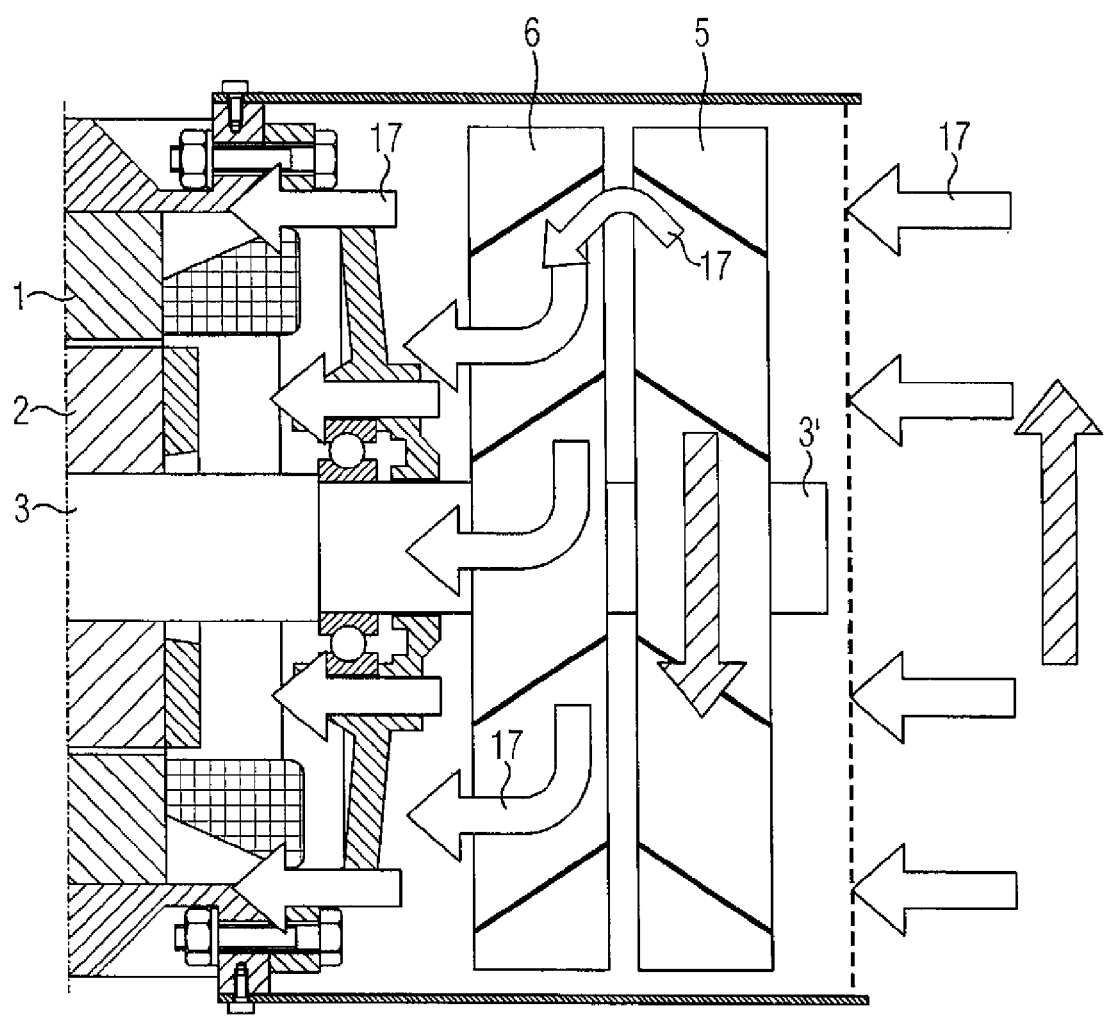
FIG. 8 shows a basic diagram of ventilation for one direction of rotation of the motor and FIG. 9 shows a basic diagram of the motor ventilation for the opposite direction of rotation.
Figure 9:
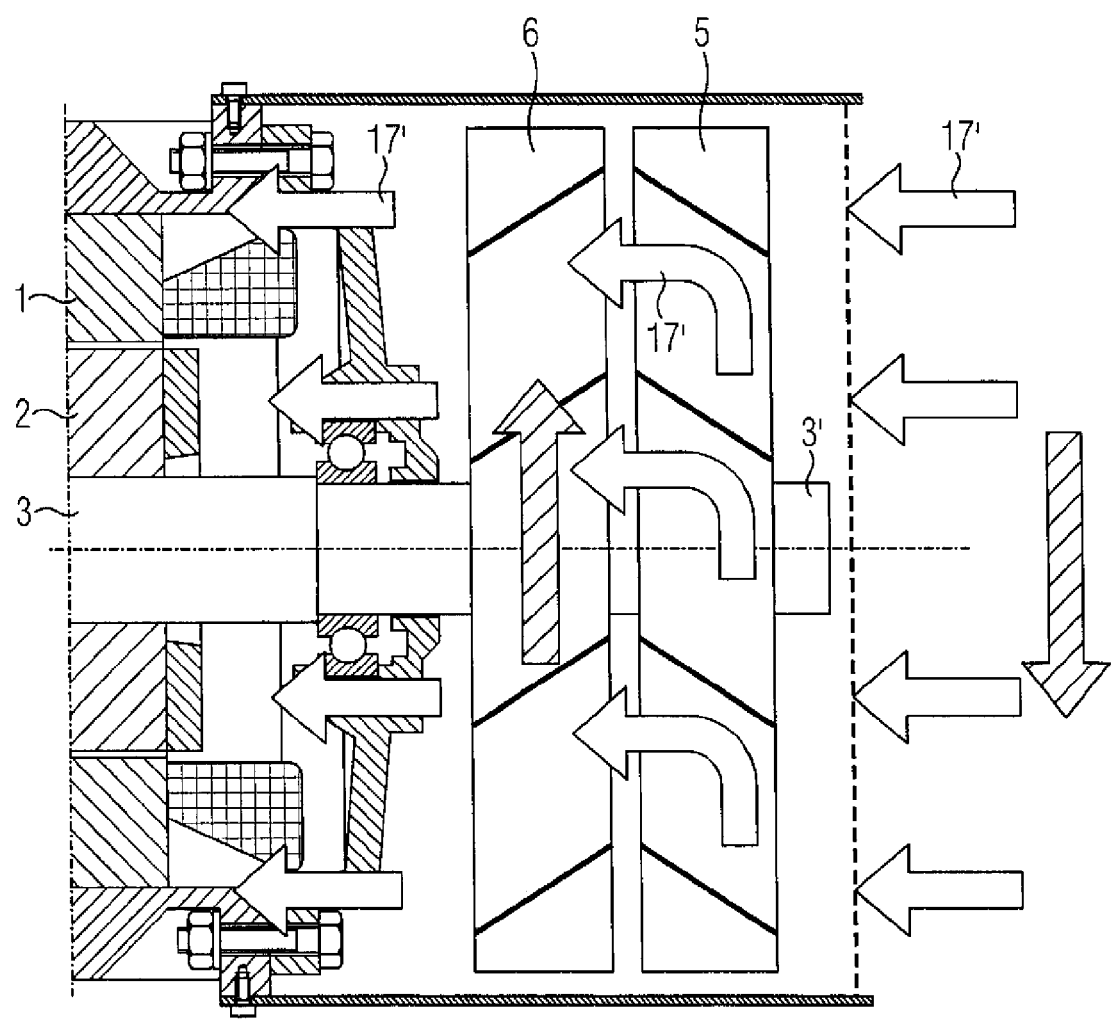

FIGS. 8 and 9 show diagrams of the cooling flow situation for different directions of rotation of the electrical machine. The diagram of FIG. 8 essentially corresponds to that of FIG. 1, with the two axial fans 5, 6 merely being depicted schematically. In the example of FIG. 8 the axial fan 6, of which the fan blades have a positive inclination in the diagram, is being driven in the direction of rotation to the left. Consequently a flow or air or cooling medium 17 which is directed towards the housing or the bearing bracket 4 respectively of the electrical machine is produced by the axial fan 6 and penetrates there into the interior of the housing. The second axial fan 5 is freewheeling here in the flow of cooling medium flow 17. It can turn along with the driven axial fan 6 but can also turn in the opposite direction.

If the shaft in accordance with FIG. 9 is rotating in the opposite direction, then axial fan 5 is driven and axial fan 6 is freewheeling. Since axial fan 5 in the diagram of FIG. 9 has fan blades with a negative inclination, the cooling medium is conveyed here through to the bearing bracket 4 of the electrical machine. The slightly modified cooling medium flow 17' occurs in this case.

In an advantageous manner, for each direction of rotation of the shaft of the electrical machine, only one of the two axial fans which are both located on the ventilation side of the electrical machine, but work in opposite directions, is driven. Regardless of the direction of rotation there is then always an appropriate flow of cooling medium onto the housing of the electrical machine. The particular advantage here is thus that the electrical machine can be cooled from one side without an external drive.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electrical machine, comprising:
   a stator;
   a rotor magnetically interacting with the stator;
   a shaft supported on a bearing bracket of a housing of the electrical machine for rotation in a first direction of rotation and in a second direction of rotation which is opposite to the first direction of rotation, with said rotor being arranged on the shaft;
   a first axial fan mounted on the shaft on a side of the rotor for co-rotation with the shaft in the first direction of rotation and having freewheeling capability on the shaft in the second direction of rotation; and
   a second axial fan mounted on the shaft on said side of the rotor for co-rotation with the shaft in the second direction of rotation and having freewheeling capability on the shaft in the first direction of rotation; and
   a coupling device, wherein the first and second axial fans are each supported on the shaft with a roller bearing, wherein in the first direction of rotation the clutch device form fittingly or friction fittingly connects the first axial fan with the shaft, and wherein in the second direction of rotation the clutch device form fittingly or friction fittingly connects the second axial fan with the shaft, wherein the clutch device has a flywheel which is rotatably received on a thread of the shaft between the first and second axial fans, wherein the flywheel has sides in one to one confronting relationship with the first and second axial fans, each of said sides being provided with a friction surface for engaging with respective corresponding friction surfaces on the first and second axial fans to thereby establish a frictional connection of the first axial fan to the shaft in the first direction of rotation and a frictional connection of the second axial fan to the shaft in the second direction of rotation.

2. The electrical machine of claim 1, wherein the first axial fan has a boss and a fan wheel connected to the boss, said fan wheel having a first inclination on a circumference of the boss, wherein the second axial fan has another boss and another fan wheel connected to the another boss, said another fan wheel having a second inclination on a circumference of the another boss, and wherein in an installed state of the first and second axial fans said first and second inclinations are oriented opposite to one another.

3. The electrical machine of claim 1, wherein the first and second axial fans are each supported on the shaft with a roller bearing with return stop.

4. The electrical machine of claim 1, wherein the clutch device has a latching mechanism with which the flywheel during said frictional connection releasably latches onto the first axial fan or onto the second axial fan so as to axially rest against the first axial fan or the second axial fan.

5. The electrical machine of claim 1, further comprising a bearing bracket inserted between the stator and the first and second axial fans, wherein the first and second axial fans are disposed on a ventilation side, wherein the shaft is supported on the bearing bracket, and wherein a flow of cooling medium is conveyable by the first and second axial fans in an axial direction through the bearing bracket directly to the stator and/or rotor.

* * * * *